Patented May 7, 1929.

1,712,005

UNITED STATES PATENT OFFICE.

JAMES M. LAMBIE AND DONALD W. ROSS, OF WASHINGTON, PENNSYLVANIA.

REFRACTORY.

No Drawing.    Application filed February 1, 1924. Serial No. 690,042.

Our invention relates to refractories, and it contemplates the use, in refractory bodies of sillimanite and of the mineral cyanite (kyanite), either in its natural state or after purification.

One special application of our invention is the use of sillimanite and of the mineral cyanite in mixes or ceramic masses for making refractory articles that are subject to shrinkage in burning or in use, such as crucibles, glass melting pots, so-called "plastic fire brick" and the like. Another special application of our invention is the use of sillimanite and cyanite in refractory walls for contact with molten glass and slags.

If refractory clay is heated sufficiently the resulting material consists of sillimanite crystals in a glass composed largely of the fluxes of the clay together with silica and some alumina. Remnants of particles of silica that are still undissolved are frequently present. Such silica may have been originally present in the clay or may have been an added ingredient. At advanced temperatures (in the neighborhood of the fusion point of cone 26) sillimanite in the process of formation from the clay and any free silica present unite to form a glass, so that a mixture of refractory clay with silica is in unstable equilibrium at such high temperatures.

Quartz, on being sufficiently heated, is transformed to the lower specific gravity forms of silica, the transformation being accompanied by expansion. On account of these properties finely divided quartz is frequently added to fire-clay bodies to compensate for the shrinkage of the other constituents during firing or use. Quartz and the low specific gravity forms of silica, tridymite and cristobalite, are subject to relatively large and sudden volume changes at relatively low temperatures (below 1000° C).

If substantially pure sillimanite is added to refractory clay, the free silica content of the mix kept as low as possible, and the mix sufficiently heated, the resulting material will be more refractory than a similar mix of refractory clay and silica without sillimanite, and will be in stable equilibrium even at very advanced temperatures. Sillimanite is exceedingly refractory, is rather inert chemically, and has a low thermal expansion, which is not subject to relatively large and sudden volume changes at any temperature.

The mineral cyanite has a specific gravity of approximately 3.56 to 3.67. On being sufficiently heated, cyanite is transformed to forms of lower specific gravity, notably sillimanite (specific gravity approximately 3.23 to 3.24), the reaction being accompanied by expansion. The transformation of cyanite into sillimanite is apparent at a lower temperature than is the corresponding change of quartz into the lower specific gravity forms of silica. Our experience with cyanite indicates that, up to the temperature at which it is transformed, its thermal expansion approximates that of sillimanite.

If cyanite instead of silica be added to refractory clay and the mix be sufficiently heated, the glass resulting, even at low temperatures from reaction of the small amounts of fluxes which are always present in the clay, aids in the transformation of the cyanite into sillimanite. The expansion accompanying this transformation counteracts shrinkage of the other ingredients in a manner similar to that noted above for quartz. The sillimanite formed from the clay builds crystals with that from the cyanite, the result being a system that is in stable equilibrium even at very advanced temperatures.

If the cyanite is finely divided and is used in sufficient percentage, and if the mix is sufficiently heated, the glassy matrix of the fired material is shot through by a rigid frame-work of closely interlocking sillimanite crystals with the result that the product is then very resistant to deformation at high temperatures either under tension or under compression.

If we add alumina to a mix made of refractory clay and finely ground cyanite, as above described, in percentage such that the sillimanite ratio of silica to alumina exists for the whole mix; and if the mix is sufficiently heated, the matrix of the fired material is an almost solid mass of interlocking sillimanite crystals. The alumina may conveniently be one of the commercial products known in the trade as "dehydrated alumina", "Aloxite", "Alundum" or the like.

Having the cyanite, or cyanite and alumina as the case may be, finely divided and uniformly distributed through the plastic clay aids in obtaining a homogeneous structure of the mix or, at least of the matrix, by the use of a lesser heat treatment than is possible if only coarse grained cyanite or cyanite and alumina be used.

Our invention makes use of the properties of sillimanite and cyanite which we have outlined above, in the production of refractories in which the prevention of shrinkage is a prime requisite. The refractory bodies with which our invention is concerned we term, for convenience, "large-tonnage" refractories, on account of the fact that most of them, such as tank blocks and shapes for use against glass, are of relatively large size and weight, or smaller sizes made in large tonnage.

With reference to our use of sillimanite as an added ingredient in refractories, it is commonly known that sillimanite is found in ordinary glass pots and other fire-clay bodies. Thus pot shell from the crown of a pot which has been burnt very hard contains a considerable percentage of sillimanite crystals. Other portions of the pot also show sillimanite, the quantity depending on the time the pot has been in the furnace, the temperature to which it has been burned, and the character of the clay mix from which the pot is made.

Consequently it is not new to produce a refractory which, after burning, contains sillimanite. However, it is new with our present invention, so far as we are aware:

1. To add sillimanite to a refractory in a commercially practicable manner.
2. To produce refractories, including refractories for use against glass and slag, which contain substantially pure sillimanite as an added ingredient.
3. To produce refractories, including refractories for use against glass and slag, which contain sillimanite as an added ingredient in percentage greater than it is possible to add by use of normal pot shell.
4. To produce a clay refractory body for general refractory purposes, including refractory bodies for use against slags and glass, which is homogenous in composition and consisting to the maximum extent of sillimanite or what with sufficient use at high temperatures will become sillimanite. We accomplish this by the addition of the proper percentage of alumina ($Al_2O_3$) and sillimanite or what, with sufficient heating, will become sillimanite.

The presence of sillimanite is commonly considered to be desirable in refractory walls for contact with glass and slags. However, the addition of sillimanite to our refractory compositions as herein described differs from the ordinary introduction of sillimanite into pot mixes as a constituent of pot shell in that the sillimanite added according to the present invention is substantially free from the fluxes and other ingredients contained in clay, and is present in larger percentages than is the sillimanite which is present in ordinary clay mixes as an incident to the addition of pot shell.

With reference to our use of cyanite as an added ingredient in refractories, we use cyanite unfired or calcined or in any desired proportion of unfired to calcined material and in any desired percentages in the mixes of clay refractories and other refractories in which the reactions of the cyanite or resulting sillimanite with the balance of the mix are not unduly detrimental. It will be noted that, while we employ our invention largely in the production of clay refractories, our invention is not restricted to this class of refractories, but may also be used to increase the refractoriness and control the shrinkage of many refractory bodies containing little or no clay.

Many refractories are subject to shrinkage during firing or use and silica has been used to counteract this shrinkage. A principal advantage of our present invention is that, in one of our procedures, we counteract this shrinkage by using a certain percentage of cyanite in the mixes, from which such refractories are made. The expansion that accompanies the transformation of cyanite to sillimanite compensates for the natural contraction of the other constituents of the mix. The percentage of cyanite used for this purpose depends largely upon the nature of the other constituents of the mix. For most purposes it appears desirable to have the cyanite well disseminated through the mix. To this end we frequently add the cyanite, or calcined cyanite as the case may be, to the mix in a finely divided condition, for the following reason. Refractory plastic clay on being fired shrinks. In mixes with fired clay used as grog, this results more or less in the formation of fine cracks throughout the mix. If a large percentage of the grog in such a mix is fine, such fine cracks are present to a lesser degree than if the grog contains but little fine material. Material such as cyanite, that on being heated takes on a permanent expansion through its conversion to sillimanite, if finely divided and uniformly disseminated through plastic clay in proper percentages, uniformly counteracts the burning shrinkages of the clay and thus prevents the formation of such cracks, that is, it aids in the continuousness of the product. By "continuousness" we mean freedom from the gaps which tend to occur during shrinkage, either in the plastic clay or between the plastic clay and the particles of grog which may be present.

Other advantages of having the cyanite finely divided and uniformly disseminated through the plastic clay are that:

1. It aids in the formation of a continuous sillimanite structure throughout the matrix.
2. The finely divided cyanite furnishes a greater surface to the fluxing ingredients of the clay, and hence finely divided cyanite in such mixes is transformed to sillimanite at appreciable rates at lower temperatures than is coarser grained cyanite.

3. One large particle, such as cyanite, that expands on being heated sufficiently in a clay mix, is more apt to disrupt the mix than is the same weight of material present as a large number of small particles.

4. It aids in obtaining a homogeneous structure of the matrix with lesser heat treatments than is possible if coarser grained cyanite is used.

Cyanite answers the double purpose of counteracting burning shrinkage in ceramic mixes and of simultaneously producing a body high in sillimanite. So far as we are aware it is impossible to produce a clay body having this combination of properties from other commercially available materials.

Cyanite has a comparatively high specific gravity. Hence the use of finely divided cyanite, uniformly distributed through the plastic clay of a fire-clay body, enables us to introduce into fire clay bodies more than the usual weight of material per unit volume in the wet state and still retain the sillimanite-forming nature of the body. The advantage of this is that in use such a body does not have to shrink as much as the usual body to close down to any given porosity, and the sillimanite cyrstals are more closely interlocking.

Another advantage of the use of cyanite in the manner described herein is that, after considerable use at high temperatures the matrix of such a body, excluding any relatively inert grog or pot-shell that may be present, will contain an almost continuous framework of interlocking sillimanite crystals, with the resulting advantage that the body in such a condition will withstand deformation at high temperatures exceedingly well. For example, a glass pot made of such a mix is, after long service, particularly resistant to ripping, if overheated.

For any given content of added cyanite, if it is desired to produce a lesser expansive effect through the transformation of the cyanite to sillimanite, or if a certain percentage of sillimanite is desired in the raw batch, part or all of the cyanite may be converted to sillimanite by calcination before being added to the batch. The sillimanite resulting from the transformation of cyanite is more refractory than practically any ingredient now used in large-tonnage refractory wares.

It is new with our present invention, so far as we are aware:

1. To add cyanite to mixes or batches for producing large-tonnage refractories.

2. To produce a refractory for use against glass which contains cyanite.

3. To employ cyanite as a source of sillimanite in the manufacture of large-tonnage refractories.

4. To employ cyanite as an agent to overcome burning shrinkage in ceramic masses.

5. To produce a refractory body for general refractory purposes, and particularly for use against glass and slags, which is homogeneous in composition and consists to the maximum obtainable extent of sillimanite obtained from cyanite or from other materials which, with sufficient use at high temperatures, will become sillimanite. We accomplish this by the addition of the proper percentage of alumina ($Al_2O_3$) to the mix, as described above.

It is to be noted particularly that by the use of cyanite we are able to obtain refractory bodies having low shrinkage, high content of alumina and high content of sillimanite. For instance, we have made fire clay bodies which contain 67% of practically pure added cyanite, the remainder of the bodies consisting of plastic clay. The sillimanite resulting in such a body is unusually high. In this connection it is interesting to note that while this cyanite body resisted sudden temperature changes well, bodies which contain such large percentages of free silica as 67% are so subject to spalling with temperature changes that they are practically useless for commercial purposes. This difference is due to the fact that cyanite has no sudden and large volume change such as is characteristic of silica.

As stated above, if finely divided cyanite is added to mixes or ceramic masses from which clay refractory articles are made, it compensates for the shrinkage of the other constituents during firing or in use. For this purpose finely divided cyanite has several advantages over silica, for example:

1. Neither cyanite nor the sillimanite derived from it is subject to sudden thermal volume changes, as are the various crystalline forms of silica.

2. The transformation of cyanite to sillimanite is apparent in appreciable degree at lower temperatures than is the transformation of quartz to the low specific gravity forms of silica and hence the cyanite begins compensating for the shrinkage of the other constituents of the mix at lower temperatures than does silica.

3. At approximately cone 26, finely divided silica in refractory clay mixes begins to pass into the glass matrix with resulting shrinkage and softening of the ware. Used in this way, cyanite has the advantage over silica that bodies containing cyanite are in stable equilibrium and are still rigid at temperatures at which silica loses its crystalline identity.

Cyanite is frequently associated with silica in nature and for use in many refractories does not need to be silica-free. The uncombined silica content needs only to be reduced to a degree permissible for the purpose intended. In many cases, where silica is not a detriment, as much as 50% or more of uncombined silica may be present. The addition, to a refractory mix, of a mixture of cyanite and silica although low in cyanite is better than the addition of silica alone.

Cyanite is apparently the only source cheap enough to be commercially available for furnishing a high sillimanite content in large-tonnage refractory ware, such as fire brick and shapes, glasshouse refractories, crucibles, etc. The cost of manufacture of artificial sillimanite is very high and the resulting product has been so expensive and impure as to make it impracticable for use in refractories. The only natural source of sillimanite of which we have knowledge is in India. This is inaccessible and so exceedingly hard, tough and difficult to pulverize that it is prohibitively expensive for industrial purposes. It has been proposed to add andalusite to fire clay for the production of sillimanite, but this has not been satisfactory because andalusite is inaccessible, very expensive and not sufficiently pure for use in high-grade refractories.

Andalusite is not readily purified by the usual methods of concentration and in addition is rather tough, so that it is not readily ground to a fine powder. Cyanite, although occurring in nature associated with silica and rutile, is readily purified by concentration. This concentrated cyanite is an unusually pure source of sillimanite. Cyanite also has the advantage that it is easily ground to a fine powder.

In the foregoing discussion we have mainly left out of consideration the presence of relatively inert ingredients such as grog and ground pot-shell. Many of our refractory products contain only plastic clay and our additional materials which may be sillimanite, cyanite or mixtures of cyanite an alumina, alumina and silica, or the like, that are capable of reacting to form sillimanite. Other products made according to our invention, especially articles of large size, contain grog, pot-shell or both, according to the usual methods of making refractory bodies. When grog or pot shell is used in this manner, it is theoretically the best practice to prepare the grog or pot shell from material having substantially the same composition with reference to the presence of sillimanite, cyanite or other sillimanite-forming ingredients, as the mix to which the grog or pot-shell is to be added. However, this ideally correct practice may often be varied by the use of grog or pot-shell of different compositions, the exact procedure in any given case depending on the desired properties of the finished products, the nature of the grog which is available, the cost of the ingredients, and other commercial factors.

We employ cyanite in a wide range of proportions, depending upon the results desired. In cases where it is merely desired to decrease the shrinkage somewhat, as little as 5% of cyanite may be used in the batch. At the other extreme, where it is desired that the properties of cyanite or sillimanite shall predominate, we employ in the batch as much as 95% of cyanite content, either raw, burnt or both raw and burnt. For example, two desirable mixtures which we have employed contained 72 per cent and 85 per cent, respectively. The remainder of the batch may, as noted above, be composed of the usual ingredients, including plastic clay, burnt clay or grog, and ground pot-shell, with or without the addition of free silica.

The raw materials in clay refractory bodies frequently consist of raw (unfired) clay, and some form of calcined clay (grog). The raw clay, or grog, or both invariably contain some free silica, either as a constituent of the clays themselves or as an added ingredient. The calcined clay may be of many forms, such as calcined dobies, cull fire brick and batts, broken glass melting pots, etc.

A desirable mix for certain refractory bodies is one made of grains of assorted sizes, the larger being coarser than one hundred (100) mesh and the other sizes being so proportioned as to form a dense body with the grains substantially in contact with one another, so that shrinkage is minimized during the drying and firing operations, and in which cyanite, or cyanite plus sillimanite, or plus alumina or any proportions of one or more of these ingredients constitute the grains, said grains being held together by a bonding material. For this purpose we preferably employ silicate of soda, or clay. However other materials commonly used to bond refractories may be used.

While cyanite performs its useful functions largely through its partial or complete transformation to sillimanite, the refractory bodies frequently contain unchanged cyanite in greater or less quantity, and this cyanite may be transformed further into sillimanite during the use of the refractory bodies, or some of it may remain unchanged throughout the life of the refractory.

Wherever the term "sillimanite" has been used herein in referring to the artificial material, it is to be understood as referring to the $3Al_2O_3 2SiO_2$ compound which is now known as "mullite".

In the claims, the expression "clay" is intended to include clay as ordinarily employed in fire-clay mixtures including raw plastic clay and burnt clay. It will be understood that our invention is not restricted to the percentage compositions herein mentioned, or to the use of the particular ingredients herein specified for use in admixture with cyanite, and that our invention includes all such modifications as fall within the scope of the appended claims.

We claim as our invention:

1. A batch mixture for forming refractory bodies containing clay, an aluminous material, and sufficient cyanite to counteract the shrinkage of the other ingredients during firing.

2. A batch mixture for forming refractory bodies, containing an aluminous material and sufficient cyanite to counteract the shrinkage of the other ingredients during firing, either the aluminous material or the cyanite being finely divided.

3. A batch mixture for forming refractory bodies, containing clay and sufficient cyanite to counteract the shrinkage of the other ingredients during firing.

4. A batch mixture for forming refractory bodies, containing sufficient cyanite to counteract the shrinkage of the other ingredients during firing, the cyanite being finely divided.

5. A batch mixture for forming refractory bodies containing clay, corundum, and sufficient cyanite to counteract the shrinkage of the other ingredients during firing.

6. The process which comprises adding cyanite to a clay mix, shaping the mass and subjecting it to heat whereby expansion of the silicate will substantially balance shrinkage of the clay to produce a refractory article having a substantially constant volume.

In testimony whereof we, the said JAMES M. LAMBIE and DONALD W. ROSS, have hereunto set our hands.

JAMES M. LAMBIE.
DONALD W. ROSS.